Aug. 7, 1928.
F. G. SLAGEL
1,679,949
FLOAT VALVE MECHANISM
Filed July 5, 1927      2 Sheets-Sheet 2
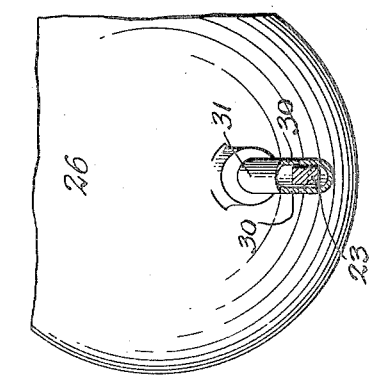
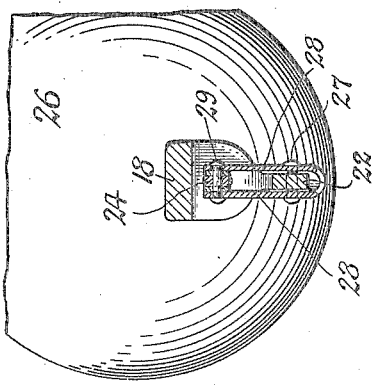
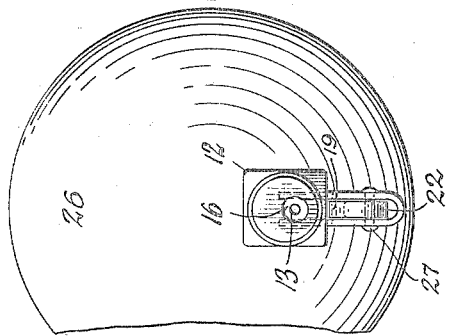
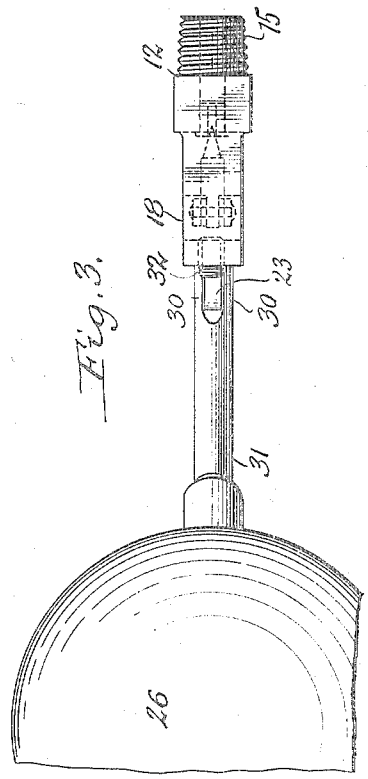
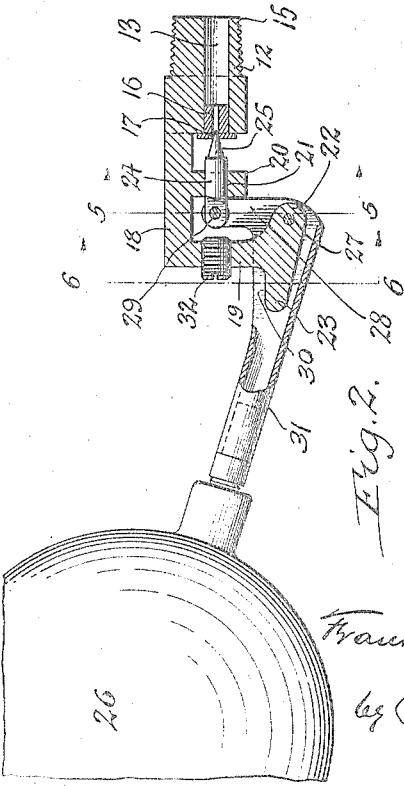
Inventor
Franklin G. Slagel
by Popper Powers
Attorneys Patented Aug. 7, 1928.

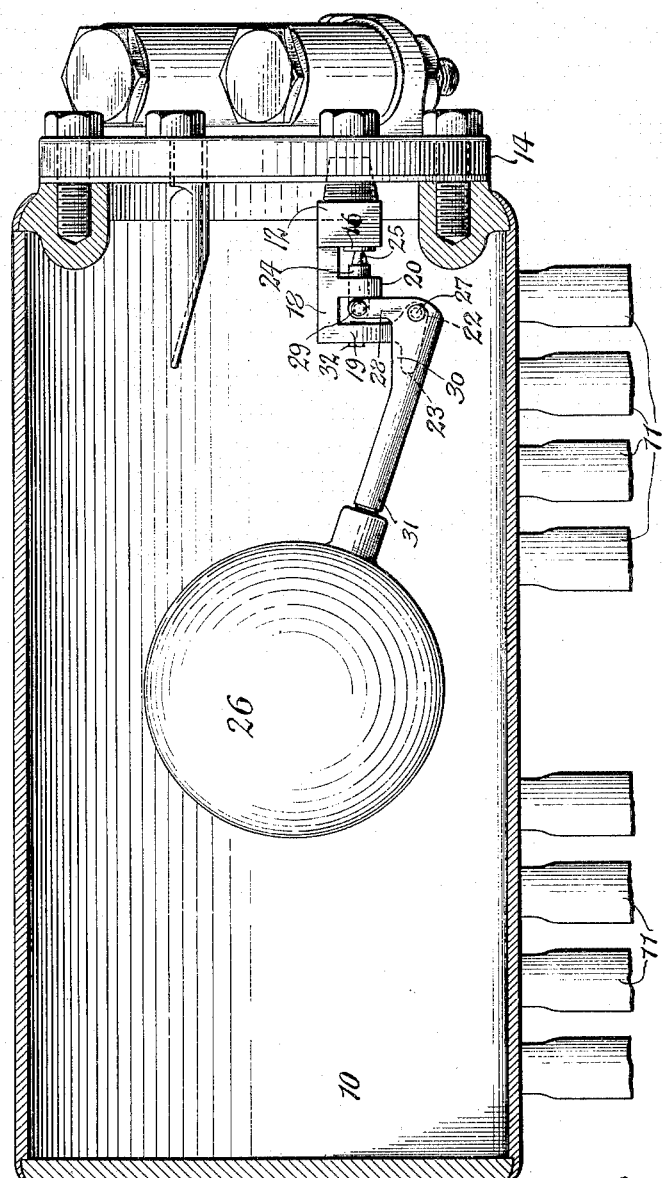

1,679,949

UNITED STATES PATENT OFFICE.

FRANKLIN G. SLAGEL, OF BUFFALO, NEW YORK, ASSIGNOR TO FEDDERS MANUFACTURING COMPANY, INC., OF BUFFALO, NEW YORK, A CORPORATION OF NEW YORK.

FLOAT-VALVE MECHANISM.

Application filed July 5, 1927. Serial No. 203,306.

This invention relates to a float valve mechanism which is more particularly designed for use in a refrigerating apparatus, although the same may be used to advantage in other installations which require such a valve.

The purpose of this invention is to provide a valve mechanism of this character in which the valve is more accurately guided in its movement toward and from its seat so as to ensure proper control; also to so guide the lever connecting the float with this valve that the same will not bind and therefore move freely and promptly; and to provide simple and efficient means for adjusting the extent of opening of the valve.

In the accompanying drawings:

Figure 1 is a vertical longitudinal section of a manifold or vaporizing chamber equipped with my improved valve mechanism. Figure 2 is a vertical longitudinal section of this valve mechanism, on an enlarged scale. Figure 3 is a top plan view thereof. Figure 4 is an end view of the same. Figures 5 and 6 are vertical transverse sections taken on the correspondingly numbered lines in Fig. 2.

Similar characters of reference indicate like parts in the several figures of the drawing.

The numeral 10 represents the vaporizing chamber or manifold which receives the refrigerant for distribution to the tubes 11, whereby the refrigerant is circulated for cooling the surrounding atmosphere.

My improved float valve mechanism for controlling admission of the refrigerant to the manifold is constructed as follows:

The numeral 12 represents the body of the float valve mechanism which is provided with a horizontal longitudinal refrigerant passage 13 which has its rear or inlet end connected with the head 14 of the manifold by an external screw thread 15. In the front or outlet end of the passage 13 is secured a bushing 16 provided at its front end with a valve seat 17. Projecting forwardly from the upper front part of the body is a horizontal bracket 18, which is provided at its front end with a depending supporting arm 19 and intermediate of its ends this bracket is provided with a depending guide arm 20. The latter is provided with a horizontal guideway 21 which is axially in line with the valve seat 17. At its lower end the supporting arm is provided with a rearwardly projecting fulcrum lug 22 and a forwardly projecting guide lug 23. Sliding lengthwise in the guideway 21 is a valve stem 24 which is provided at its rear end with a valve 25 having the form of a conical needle which is adapted to cooperate with the valve seat 17 for controlling the admission of refrigerant into the manifold.

On the fulcrum lug 22 of the supporting arm is mounted an elbow lever which connects the valve stem with a float 26. This lever is partly bifurcated and straddles or embraces the supporting arm, fulcrum lug and guide lug of the bracket and is pivoted at its elbow to the fulcrum lug by a transverse pin 27. The rear arm of this lever forms two side pieces 28 which project upwardly from the fulcrum lug on opposite sides of the front end of the valve stem and are loosely connected with the latter by a transverse coupling pin 29. The front arm of the lever forms two side pieces 30 which receive between them the guide lug of the bracket and these side pieces merge into a tube 31 which forms the front end of the front lever arm and which is connected with the float. When the level of the liquid refrigerant in the manifold drops below normal the downward movement of the float with the descending level of the liquid will cause the valve to be opened and admit more liquid into the manifold and when the normal level of the liquid has been again restored the rising float will close the valve and thus cut off further admission of fluid.

This means of guiding the valve and connecting the same with the float permits the valve to always remain in alinement with its seat and thereby enables the same to close tightly inasmuch as it is not subject to any strains which are liable to interfere with its proper seating.

By providing the bracket with a supporting arm having a fulcrum lug and a guide lug which are straddled or embraced by the bifurcated part of the float lever the latter is guided in its vertical movements and prevented from assuming a position which would cramp the same and interfere with its transmission of movement to the valve, thereby causing the latter to be opened and closed easily, accurately and promptly.

On the supporting arm of the bracket is mounted an adjustable stop 32 having the form of a screw arranged in front of the valve stem and adapted to be engaged by the front end of the latter for limiting the forward movement of the valve. By means of this adjustable stop screw the extent of opening of the valve can be regulated to suit different conditions or requirements.

As a whole this valve is very simple, durable and compact in construction, the same is not liable to get out of order and its cost of production is low.

I claim as my invention:

1. A float valve mechanism comprising a body having a passage provided at its front end with a valve seat, a bracket projecting forwardly from the upper front part of said body and provided at its front end with a depending supporting arm and on its intermediate part with a depending guide arm, a valve stem guided on said guide arm to move axially in line with said seat and provided at its rear end with a valve movable toward and from said seat, a lever pivoted on said supporting arm to swing vertically and connected with said valve stem, and a float mounted on said lever.

2. A float valve mechanism comprising a body having a passage provided at its front end with a valve seat, a bracket projecting forwardly from the upper front part of said body and provided at its front end with a depending supporting arm and on its intermediate part with a depending guide arm, a valve stem guided on said guide arm to move axially in line with said seat and provided at its rear end with a valve movable toward and from said seat, an elbow lever pivoted at its elbow on said arm and having a rear arm projecting upwardly from said pivot and connected with the front end of said valve stem and a front arm projecting forwardly from said pivot, and a float mounted on said front arm.

3. A float valve mechanism comprising a body having a passage provided at its front end with a valve seat, a bracket projecting forwardly from the upper front part of said body and provided at its front end with a depending supporting arm and on its intermediate part with a depending guide arm, a valve stem guided on said guide arm to move axially in line with said seat and provided at its rear end with a valve movable toward and from said seat, an elbow lever pivoted at its elbow on said arm and having a rear arm projecting upwardly from said pivot and connected with the front end of said valve stem and a front arm projecting forwardly from said pivot, a float mounted on said front arm, and an adjustable screw stop arranged in said supporting arm and adapted to arrest the forward movement of said valve stem.

4. A float valve mechanism comprising a body having a horizontal longitudinal passage provided at its front end with a valve seat, a bracket projecting forwardly from the upper front part of said body and having a depending guide arm on its intermediate part and a depending supporting arm on its front end which is provided at its lower end with a forwardly projecting guide lug and a rearwardly projecting fulcrum lug, a valve stem slidable in said guide arm and provided at its rear end with a valve movable toward and from said valve seat, an elbow lever of bifurcated form which straddles said depending arm and its guide and fulcrum lugs and is pivoted to said fulcrum lug and has a rear arm projecting upwardly from said pivot and connected with said valve stem and a front arm which projects forwardly from said pivot, and a float mounted on said front arm.

5. A float valve mechanism comprising a body having a horizontal longitudinal passage provided at its front end with a valve seat, a bracket projecting forwardly from the upper front part of said body and having a depending guide arm on its intermediate part and a depending supporting arm on its front end which is provided at its lower end with a forwardly projecting guide lug and a rearwardly projecting fulcrum lug, a valve stem slidable in said guide arm and provided at its rear end with a valve movable toward and from said valve seat, an elbow lever of bifurcated form which straddles said depending arm and its guide and fulcrum lugs and is pivoted to said fulcrum lug and has a rear arm projecting upwardly from said pivot and connected with said valve stem and a front arm which projects forwardly from said pivot and terminates in a tube, and a float connected with said tube.

In testimony whereof I affix my signature.

FRANKLIN G. SLAGEL.